United States Patent
Slusar

(10) Patent No.: US 12,240,468 B1
(45) Date of Patent: Mar. 4, 2025

(54) DRIVING ANALYSIS USING VEHICLE-TO-VEHICLE COMMUNICATION

(71) Applicant: Allstate Insurance Company, Northbrook, IL (US)

(72) Inventor: Mark V. Slusar, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 837 days.

(21) Appl. No.: 16/568,849

(22) Filed: Sep. 12, 2019

Related U.S. Application Data

(63) Continuation of application No. 15/459,851, filed on Mar. 15, 2017, now Pat. No. 10,414,407, which is a (Continued)

(51) Int. Cl.
*B60W 40/09* (2012.01)
*B60W 40/105* (2012.01)
(Continued)

(52) U.S. Cl.
CPC .......... *B60W 40/09* (2013.01); *B60W 40/105* (2013.01); *G06Q 40/08* (2013.01);
(Continued)

(58) Field of Classification Search
CPC .... B60W 40/09; B60W 40/105; B60W 40/08; B60W 2556/65; B60W 2554/80;
(Continued)

(56) References Cited

U.S. PATENT DOCUMENTS

| 4,119,166 A | 10/1978 | Ayotte et al. |
| 4,622,636 A | 11/1986 | Tachibana |

(Continued)

FOREIGN PATENT DOCUMENTS

| CN | 101131588 A | 2/2008 |
| DE | 102010001006 A1 | 7/2011 |

(Continued)

OTHER PUBLICATIONS

X. Zeng, K. Yin and H. Ge, "Hazardous Driving Prediction System," Submission to The Connected Vehicle Technology Challenge (Year: 2014).*

(Continued)

*Primary Examiner* — Marc Burgess
*Assistant Examiner* — Karen Lynelle Furgason
(74) *Attorney, Agent, or Firm* — Dinsmore & Shohl LLP

(57) ABSTRACT

One or more driving analysis computing devices in a driving analysis system may be configured to analyze driving data, determine driving behaviors, and calculate driver scores based on driving data transmitted using vehicle-to-vehicle (V2V) communications. Driving data from multiple vehicles may be collected by vehicle sensors or other vehicle-based systems, transmitted using V2V communications, and then analyzed and compared to determine various driving behaviors by the drivers of the vehicles. Driver scores may be calculated or adjusted based on the determined driving behaviors of vehicle drivers, and also may be calculated or adjusted based on other the driver scores of nearby vehicles.

20 Claims, 7 Drawing Sheets

Related U.S. Application Data continuation of application No. 14/832,197, filed on Aug. 21, 2015, now Pat. No. 9,623,876, which is a continuation of application No. 13/904,682, filed on May 29, 2013, now Pat. No. 9,147,353.

(51) Int. Cl.
*G06Q 40/08* (2012.01)
*G08G 1/00* (2006.01)
*G08G 1/01* (2006.01)
*G09B 19/16* (2006.01)
*G08G 1/0967* (2006.01)

(52) U.S. Cl.
CPC .......... *G08G 1/0112* (2013.01); *G08G 1/22* (2013.01); *G09B 19/167* (2013.01); *B60W 2554/80* (2020.02); *B60W 2556/65* (2020.02); *G08G 1/096791* (2013.01)

(58) Field of Classification Search
CPC ........ G06Q 40/08; G08G 1/0112; G08G 1/22; G09B 19/167
See application file for complete search history.

(56) References Cited

U.S. PATENT DOCUMENTS

| | | | |
|---|---|---|---|
| 5,053,964 A | 10/1991 | Mister et al. | |
| 5,295,551 A | 3/1994 | Sukonick | |
| 5,572,449 A | 11/1996 | Tang et al. | |
| 5,680,122 A | 10/1997 | Mio | |
| 5,710,565 A | 1/1998 | Shirai et al. | |
| 5,797,134 A | 8/1998 | McMillan et al. | |
| 6,116,369 A | 9/2000 | King et al. | |
| 6,128,559 A | 10/2000 | Saitou et al. | |
| 6,188,950 B1 | 2/2001 | Tsutsumi et al. | |
| 6,301,530 B1 | 10/2001 | Tamura | |
| 6,389,351 B1 | 5/2002 | Egawa et al. | |
| 6,415,226 B1 | 7/2002 | Kozak | |
| 6,442,484 B1 * | 8/2002 | Miller | B60R 21/0134 701/532 |
| 6,502,035 B2 | 12/2002 | Levine | |
| 6,647,328 B2 | 11/2003 | Walker | |
| 6,675,094 B2 | 1/2004 | Russell et al. | |
| 6,707,378 B2 | 3/2004 | MacNeille et al. | |
| 6,732,024 B2 | 5/2004 | Wilhelm Rekow et al. | |
| 6,780,077 B2 | 8/2004 | Baumgartner et al. | |
| 6,982,635 B2 | 1/2006 | Obradovich | |
| 7,116,248 B2 | 10/2006 | Lu et al. | |
| 7,286,825 B2 | 10/2007 | Shishido et al. | |
| 7,304,589 B2 | 12/2007 | Kagawa | |
| 7,315,239 B2 | 1/2008 | Cheng et al. | |
| 7,339,483 B1 | 3/2008 | Farmer | |
| 7,610,210 B2 | 10/2009 | Helitzer et al. | |
| 7,650,211 B2 | 1/2010 | Wang et al. | |
| 7,660,725 B2 | 2/2010 | Wahlbin et al. | |
| 7,664,589 B2 | 2/2010 | Etori et al. | |
| 7,739,087 B2 | 6/2010 | Qiu | |
| 7,805,321 B2 | 9/2010 | Wahlbin et al. | |
| 7,821,421 B2 | 10/2010 | Tamir et al. | |
| 7,966,118 B2 | 6/2011 | Kade | |
| 7,991,629 B2 | 8/2011 | Gay et al. | |
| 8,031,062 B2 | 10/2011 | Smith | |
| 8,065,169 B1 | 11/2011 | Oldham et al. | |
| 8,078,349 B1 | 12/2011 | Prada Gomez et al. | |
| 8,078,382 B2 | 12/2011 | Sugano et al. | |
| 8,086,523 B1 | 12/2011 | Palmer | |
| 8,090,598 B2 | 1/2012 | Bauer et al. | |
| 8,139,109 B2 | 3/2012 | Schmiedel et al. | |
| 8,145,393 B2 | 3/2012 | Foster et al. | |
| 8,152,589 B2 | 4/2012 | Bowen et al. | |
| 8,160,809 B2 | 4/2012 | Farwell et al. | |
| 8,180,655 B1 * | 5/2012 | Hopkins, III | G06Q 10/10 705/40 |
| 8,229,618 B2 | 7/2012 | Tolstedt et al. | |
| 8,280,308 B2 | 10/2012 | Anschutz et al. | |
| 8,290,701 B2 | 10/2012 | Mason et al. | |
| 8,314,718 B2 | 11/2012 | Muthaiah et al. | |
| 8,326,473 B2 | 12/2012 | Simpson et al. | |
| 8,335,607 B2 | 12/2012 | Gatten et al. | |
| 8,352,112 B2 | 1/2013 | Mudalige | |
| 8,407,139 B1 | 3/2013 | Palmer | |
| 8,457,827 B1 | 6/2013 | Ferguson et al. | |
| 8,457,892 B2 | 6/2013 | Aso et al. | |
| 8,538,785 B2 | 9/2013 | Coleman et al. | |
| 8,577,703 B2 | 11/2013 | McClellan et al. | |
| 8,595,037 B1 | 11/2013 | Hyde et al. | |
| 8,620,693 B1 | 12/2013 | Schumann, Jr. | |
| 8,639,535 B1 | 1/2014 | Kazenas | |
| 8,686,844 B1 * | 4/2014 | Wine | G08G 1/20 340/439 |
| 8,750,306 B2 | 6/2014 | Yousefi et al. | |
| 10,347,127 B2 * | 7/2019 | Droz | B60W 50/0098 |
| 2002/0016653 A1 * | 2/2002 | Levine | B60K 28/16 701/1 |
| 2002/0111725 A1 * | 8/2002 | Burge | G07C 5/008 701/31.4 |
| 2002/0178033 A1 | 11/2002 | Yoshioka et al. | |
| 2003/0187704 A1 | 10/2003 | Hashiguchi et al. | |
| 2004/0103006 A1 | 5/2004 | Wahlbin et al. | |
| 2004/0103010 A1 | 5/2004 | Wahlbin et al. | |
| 2004/0153362 A1 | 8/2004 | Bauer et al. | |
| 2006/0161341 A1 | 7/2006 | Haegebarth et al. | |
| 2006/0221328 A1 | 10/2006 | Rouly | |
| 2007/0136107 A1 | 6/2007 | Maguire et al. | |
| 2008/0059007 A1 | 3/2008 | Whittaker et al. | |
| 2008/0091309 A1 | 4/2008 | Walker | |
| 2008/0243558 A1 | 10/2008 | Gupte | |
| 2008/0319602 A1 | 12/2008 | Mcclellan et al. | |
| 2009/0079839 A1 | 3/2009 | Fischer et al. | |
| 2010/0030586 A1 | 2/2010 | Taylor et al. | |
| 2010/0131300 A1 | 5/2010 | Collopy et al. | |
| 2010/0131304 A1 | 5/2010 | Collopy et al. | |
| 2010/0302371 A1 | 12/2010 | Abrams | |
| 2010/0324775 A1 | 12/2010 | Kermani et al. | |
| 2011/0029170 A1 | 2/2011 | Hyde et al. | |
| 2011/0202305 A1 | 8/2011 | Willis et al. | |
| 2011/0210867 A1 | 9/2011 | Benedikt | |
| 2012/0034876 A1 | 2/2012 | Nakamura et al. | |
| 2012/0053808 A1 | 3/2012 | Arai et al. | |
| 2012/0072243 A1 | 3/2012 | Collins et al. | |
| 2012/0083960 A1 | 4/2012 | Zhu et al. | |
| 2012/0101660 A1 | 4/2012 | Hattori | |
| 2012/0123641 A1 | 5/2012 | Ferrin et al. | |
| 2012/0197669 A1 | 8/2012 | Kote et al. | |
| 2012/0290146 A1 | 11/2012 | Dedes et al. | |
| 2013/0013179 A1 | 1/2013 | Lection et al. | |
| 2013/0030606 A1 | 1/2013 | Mudalige et al. | |
| 2013/0037650 A1 | 2/2013 | Heppe | |
| 2013/0052614 A1 | 2/2013 | Mollicone et al. | |
| 2013/0057397 A1 * | 3/2013 | Cutler | G08G 1/167 701/25 |
| 2013/0073321 A1 | 3/2013 | Hofmann et al. | |
| 2013/0144461 A1 | 6/2013 | Ricci | |
| 2013/0144657 A1 | 6/2013 | Ricci | |
| 2013/0147638 A1 | 6/2013 | Ricci | |
| 2013/0179198 A1 | 7/2013 | Bowne et al. | |
| 2013/0198737 A1 | 8/2013 | Ricci | |
| 2013/0198802 A1 | 8/2013 | Ricci | |
| 2013/0200991 A1 | 8/2013 | Ricci et al. | |
| 2013/0203400 A1 | 8/2013 | Ricci | |
| 2013/0204645 A1 | 8/2013 | Lehman et al. | |
| 2013/0212659 A1 | 8/2013 | Maher et al. | |
| 2013/0218603 A1 | 8/2013 | Hagelstein et al. | |
| 2013/0218604 A1 | 8/2013 | Hagelstein et al. | |
| 2013/0250933 A1 | 9/2013 | Yousefi et al. | |
| 2013/0279393 A1 * | 10/2013 | Rubin | H04W 56/0035 370/312 |
| 2013/0304514 A1 | 11/2013 | Jyde et al. | |
| 2014/0074512 A1 | 3/2014 | Hare et al. | |
| 2014/0080098 A1 | 3/2014 | Price | |
| 2014/0236414 A1 * | 8/2014 | Droz | G08G 1/015 701/1 |

(56) References Cited

U.S. PATENT DOCUMENTS

| | | | |
|---|---|---|---|
| 2014/0272810 | A1 | 9/2014 | Fields et al. |
| 2014/0303966 | A1* | 10/2014 | Adachi ............. H04M 1/72457 704/201 |
| 2014/0350970 | A1 | 11/2014 | Schumann, Jr. et al. |

FOREIGN PATENT DOCUMENTS

| | | | |
|---|---|---|---|
| EP | 1296305 | A1 | 3/2003 |
| EP | 2293255 | A1 | 3/2011 |
| EP | 2471694 | A2 | 7/2012 |
| JP | 2009181472 | A * | 8/2009 |
| WO | 2001039090 | A1 | 5/2001 |
| WO | 2008067872 | A1 | 6/2008 |
| WO | 2008096376 | A1 | 8/2008 |
| WO | 2012014042 | A2 | 2/2012 |
| WO | 2012150591 | A2 | 11/2012 |
| WO | 2013012926 | A1 | 1/2013 |
| WO | 2013160908 | A2 | 10/2013 |

OTHER PUBLICATIONS

Kirkpatrick, Keith, "Legal issues with Robots," Communications of the ACM, Nov. 2013, vol. 56 No. 11, pp. 17-19.
Ingolfo, Silvia, and Silva Souza, Vitor E., "Law and Adaptivity in Requirements Engineering," SEAMS 2013, pp. 163-168.
O'Donnell, Anthony, "Prepare for Deep Auto Insurance Premium Drop Scenario, Celent Report Advises," Insurance & Technology, May 8, 2012, downloaded from http://www.insurancetech.com/claims/prepare-for-deep-auto-insurance-premium/232901645?printer_friendly=this-page, Jan. 9, 2014, 3 pages.
Top issues: An annual report "The insurance industry in 2013; Strategy: Reshaping auto insurance", vol. 5, 2013, 6 pages.
O'Donnell, Anthony, "Rapid Emergence of Driverless Cars Demands Creation of Legal Infrastructure, Stanford Scholar Says," Insurance & Technology—Online, Jan. 3, 2013, downloaded from http: 1 1 search.proquest.com .ezproxy.apollolibrary.com/ docview / 12 66 314 720 /fulltext/ 142 DA8916CC2 E861A141/ 11 ?accountid = 3 5812, Jan. 8, 2014, 2 pages.
"Self-driving cars: The next revolution" (kpmg.com | cargroup.org), 2012, 36 pages.
The autonomous car: The road to driverless driving, May 30, 2013, downloaded from analysis.telematicsupdate.com/v2x-safety/autonomous-car-road-driverless-driving on Jan. 2, 2014, 6 pages.
Ruquet, Mark E., "Who Insures a Driverless Car"? Property & Casualty 360, Oct. 1, 2012, downloaded from http:/ / search.proquest.com on Jan. 8, 2014, 2 pages.
Neil, Dan, "Who's Behind the Wheel? Nobody. The driverless car is coming. And we all should be glad it is," Wall Street Journal (Online) [New York, N.Y] Sep. 24, 2012, downloaded from http:/ /search.proquest.com on Jan. 8, 2014, 4 pages.
Bylund, Anders, "Would You Buy a Self-Driving Car to Save 80% on Auto Insurance?" The Motley Fool, Nov. 27, 2013, http://www.dailyfinance.com/2013/11/27/would-you-buy-a-self-driving-car-to-save-80-on-car/, 2 pages.
Litman, Todd, "Autonomous Vehicle Implementation Predictions Implications for Transport Planning," Victoria Transport Policy Institute, Dec. 23, 2013, 19 pages.
Zeng, X., Yin, K., and Ge, H., "Hazardous Driving Prediction System," Submission to The Connected Vehicle Technology Challenge, Sep. 24, 2014, 20 pages.
Jan. 1, 20155 (US) Non-Final Office Action—U.S. Appl. No. 14/163,761.
Jan. 2, 20151 (US) Non-Final Office Action—U.S. Appl. No. 14/163,719.
VentureBeat.com webpage; "Cisco and NXP encourage car communication to make driving safer" www.venturebeat.com/2013/01/04/cisco-and-nxp-encourage-car-communication-to-make-driving-safer/, Rebecca Grant dated Jan. 4, 2013.

Yang et al., "A vehicle-to-vehicle communication protocol for cooperative collision warning"; Aug. 2004.
Festag et al., "Vehicle-to-vehicle and road-side sensor communication for enhanced road safety"; Nov. 2008.
Zalstein, David, CarAdvice. com webpage, "First large-scale vehicle-to-vehicle communication technology test unveiled" dated Aug. 22, 2012, www.caradvice.com.au/187379/first-large-scale-vehicle-to-vehicle-communication-technology-test-unveiled/basic-rgb-4/, 3 pages.
BMW.com webpage; "BMW Technology Guide: Car-to-car communication" www.bmw.com/com/en/insights/technology/technology_guide/articles/cartocar_communication.html; downloaded Apr. 5, 2013.
NEC.com webpage; "Car2Car Communication" www/nec.com/en/global.onlinetv/en/society/car_commu_l:html; downloaded Apr. 5, 2013.
Xu, Qing et al., "Vehicle-to-Vehicle Safety Messaging in DSRC"; 2004.
EE Herald webpage, "DSRC Packet Sniffer, a vehicle-to-vehicle communication technology is under demo"; www.eeherald.com/section/news/nw10000198.html; dated Nov. 22, 2008.
Bai, Fan et al., "Reliability Analysis of DSRC Wireless Communication for Vehicle Safety"; Sep. 2006.
Kotani, Kazuya et al., "Inter-Vehicle Communication Protocol for Cooperatively Capturing and Sharing Intersection Video"; date unkown but believed to be before 2011.
BC Technology Webpage; "CarCom Intercom System"; www.bctechnologyltd.co.uk/clarson-intercom-system-brochure.htm; downloaded May 29, 2013.
Wolf Intercom webpage; "Wolf Intercom Systems"; http://wolfintercom.com/; downloaded May 29, 2013.
Telephonics Webpage; "Integrated Communication Systems Wired & Wireless Secure Intercommunications"; www.telephonics.com/netcom.asp; downloaded May 29, 2013.
Car-to-Car webpage; "Car-2-Car Communication"; www.car-to-car.org/index.php?id=8; downloaded May 29, 2013.
Cohda Wireless webpage; www.cohdawireless.com/default.html; downloaded May 29, 2013.
Eichler, Stephen et al., "Car-to-Car Communication" dated Oct. 2006.
Oki Webpage "OKI Develops World's First DSRC Inter-vehicle Communication Attachment for Mobile Phones to Help Pedestrian Safety" dated Jan. 8, 2009.
Light, Donald, "A Scenario: The End of Auto Insurance," May 8, 2012, downloaded Nov. 11, 2013 from ww.celent.com/reports/scenario-end-auto-insurance, 2 pages.
"Driver Assistance Systems," Robert Bosch GmbH, downloaded Oct. 27, 2013 from www.bosch-automotivetechnology.us/en_us/us/driving_comfort_1/driving_comfort_systems_for_passenger_cars_2/driver_assistance_systems_5/driver_assistan . . .12 pages.
"Autonomous Car," Wikipedia, the free encyclopedia, downloaded Nov. 11, 2013 from en.wikipedia.org/wiki/Autonomous_car#cite_ref-28, 20 pages.
"Schlaue Autos von A bis Z." Encyclopedia, downloaded Oct. 27, 2013 from www.bester-beifahrer.de/startseite/lexikon/, 15 pages.
"Chassis Systems Control, Adaptive Cruise Control: More comfortable driving," Robert Bosch GmbH, Brochure downloaded Oct. 26, 2013, 4 pages.
"Get Ready for Automated Cars," Houston Chronicle, Sep. 11, 2012, downloaded Nov. 11, 2013, 1 page.
Levy, Steven, Salmon, Felix, Stokes, Jon, "Artificial Intelligence is Here. In Fact, It's All Around Us. But It's Nothing Like We Expected," Jan. 2011, 14 pages.
"Driverless cars study: 1 in 5 would let computers do the driving," Nov. 4, 2013, downloaded Dec. 19, 2013 from http://www.carinsurance.com/press/driverless-cars-survey-results.aspx, 2 pages.
Shladover, Steven E. "What if Cars Could Drive Themselves," Access Magazine, University of California Transportation Center, UC Berkeley, Apr. 1, 2000, downloaded Dec. 19, 2013, 7 pages.
Kim, Mun Hyun, Dickerson, Julie, Kosko, Bart, "Fuzzy throttle and brake control for platoons of smart cars," University of Southern California, Received May 1995, revised Aug. 1995, downloaded Dec. 19, 2013, 26 pages.

(56) References Cited

OTHER PUBLICATIONS

"A velocity control strategy for vehicular collision avoidance system," Abstract downloaded on May 9, 2013 from ieeexplore.ieee.org/xpl/articleDetails.jsp?tp=&arnumber=1626838&contentType=Conference+Publications&queryText%3DA+velocity+control+strategy+for . . . , 1 page.

"Fuzzy system representation of car-following phenomena," Abstract downloaded on May 9, 2013 from ieeexplore.ieee.org/xpl/articleDetails.jsp?tp=&arnumber=527798&contentType=Conference+Publications&queryText%3DFuzzy+system+representation+of . . . , 1 page.

"Direct adaptive longitudinal control of vehicle platoons," Abstract downloaded on May 9, 2013 from ieeexplore.ieee.org/xpl/articleDetails.jsp?tp=&arnumber=917908&contentType=Journals+%26+Magazines&queryText%3DDirect+adaptive+longitudinal+c . . . , 1 page.

Sharma, Devansh, "Development of Leader-Follower Robot in IIT BOMBAY," 4 pages.

Noguchi, Noboru, Will, Jeff, Reid, Joh, and Zhang, Qin, "Development of a master-slave robot system for farm operations," Computers and Electronics in Agriculture 44 (2004), 19 pages.

"Project SARTRE (Safe Road Trains for the Environment)," Road Traffic Technology, downloaded on May 9, 2013 from www.roadtraffic-technology.com/projects/the-sartre-project/, 3 pages.

"A semi-autonomous tractor in an intelligent master-slave vehicle system," Oct. 2010, vol. 3, Issue 4, pp. 263-269, downloaded Dec. 19, 2013 from http://link.springer.com/article/10.1007%2Fs11370-010-0071-6, 4 pages.

"Development of an intelligent master-slave system between agricultural vehicles," Abstract downloaded on Dec. 19, 2013 from http://ieeexplore.ieee.org/xpl/login.jsp?tp=&arnumber=5548056&url=http%3A%2F%2Fi . . . , 1 page.

"A leader-follower formation flight control scheme for UAV helicopters," Abstract downloaded on Dec. 19, 2013 from http://ieeexplore.ieee.org/xpl/login.jsp?tp=&arnumber=4636116&url=http%3A%2F%2Fi . . . , 1 page.

Kurian, Bonny, "Auto-Insurance—Driving into the sunset?", Tala Consultancy Services, 2013.

O'Brien, Christine, "Autonomous Vehicle Technology: Consideration for the Auto Insurance Industry", University Transportation Resource Center (The 2nd Connected Vehicles Symposium, Rutgers University), Jun. 17, 2013.

Anderson, James M. et al., "Autonomous Vehicle Program: A Guide for Policymakers", Rand Corporation: Transportation, Space, and Technology Program, 2014.

Marchant, Gary E. et al., "The Coming Collision Between Autonomous Vehicles and the Liability System", Santa Clara Law Review (vol. 52: No. 4 (Article 6)), Dec. 17, 2012.

"The Munix Advantage", AUMA, retrieved Apr. 8, 2014, <htlp://www.aumaca/live/digitalAssets/71/712&8_MUNIx_onepager.pdf>.

"The Use of Occupation and Education Factors in Automobile Insurance", State of New Jersey: Department of Banking and Insurance, Apr. 2008.

"Preliminary Statement of Policy Concerning Automated Vehicles", National Highway Traffic Safety Administration, retrieved Jun. 9, 2014.

Walker Smith, Bryant, "Summary of levels of Driving Automation for On-Road Vehicles", Stanford Law School: The Center for Internet and Society, Dec. 18, 2013, <http://cyberlaw.stanford.edu/blog/2013/12/sae-levels-driving-automation>.

Auto Insurance Discounts, Liberty Mutual Insurance, downloaded from http://www.libertymutual.com/auto-insurance/auto-insurance-coverage/auto-insurance-discounts, Jan. 8, 2014, 2 pages.

Autonomous Vehicles Regulations, California Department of Motor Vehicles, 2011, downloaded from www.dmv.ca.gov/vr/autonomous/auto.htm, Jan. 2, 2014, 3 pages.

Sharma, Aroma, Autonomous Vehicle Conf Recap 2012: "Driving the Future: The Legal Implications of Autonomous Vehicles," High Tech Law Institute, downloaded from law.scu.edu/hightech/autonomousvehicleconfrecap2012/, Jan. 2, 2014, 7 pages.

Strumpf, Dan, "Corporate News: Driverless Cars Face Issues of Liability", Strumpf Dan, The Wall Street Journal Asia [Hong Kong] Jan. 29, 2013: 19, downloaded from http://search.proquest.com.ezproxy, Jan. 8, 2014, 2 pages.

Lienert, Anita, Drivers Would Opt for Autonomous Cars to Save on Insurance, Study Finds: Published: Nov. 7, 2013, downloaded from www.edmunds.com/car-news/drivers-would-opt-for-autonomous-cars-to-save-on-insurance-study-finds.html on Jan. 2, 2014, 6 pages.

Neumann, Peter G. and Contributors, "Risks to the Public," ACM SIGSOFT Software Engineering Notes, Jul. 2012 vol. 37 No. 4, pp. 20-29.

* cited by examiner

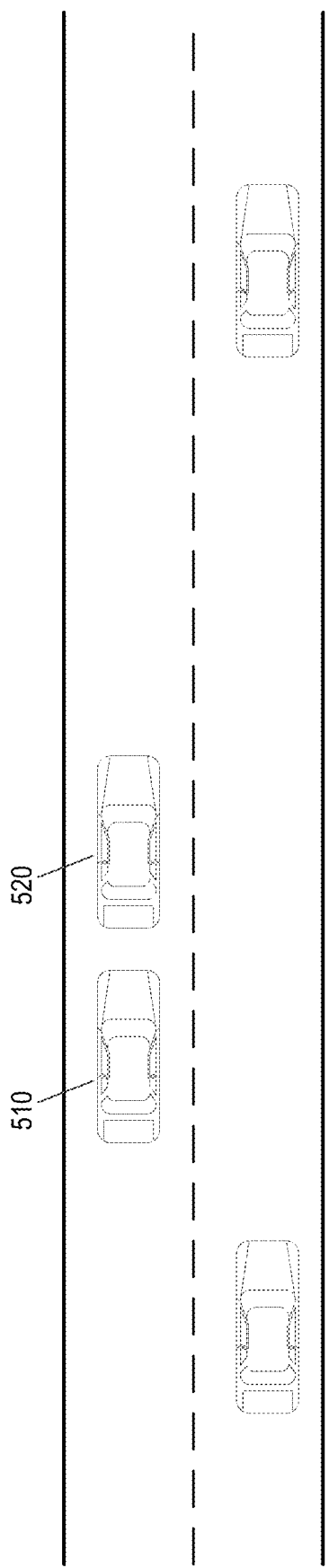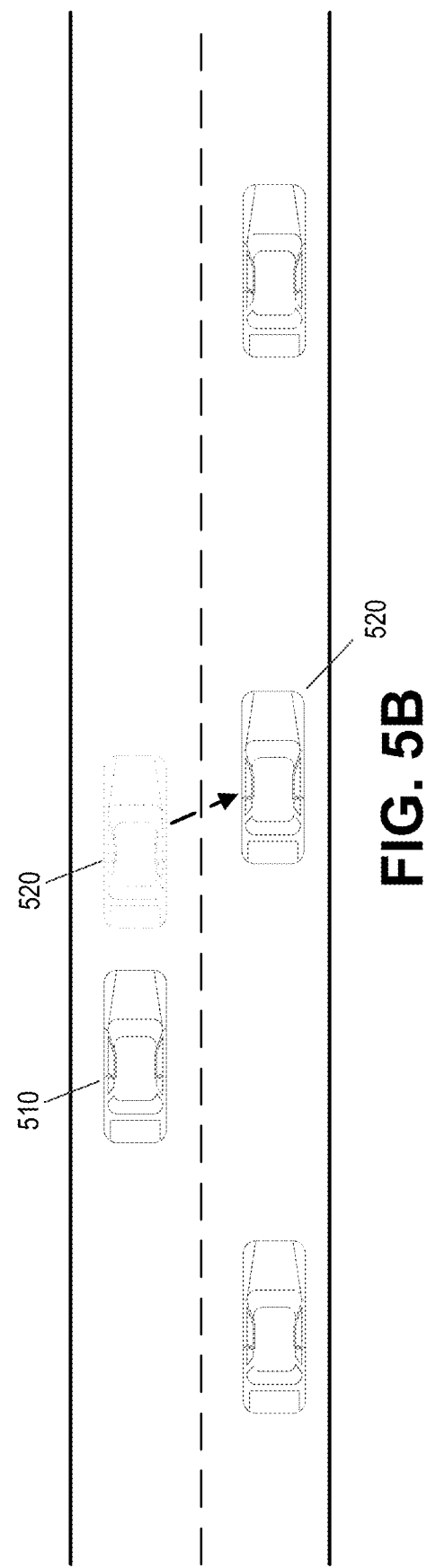

DRIVING ANALYSIS USING VEHICLE-TO-VEHICLE COMMUNICATION

CROSS REFERENCE TO RELATED APPLICATIONS

This application is a continuation of and claims priority to co-pending U.S. application Ser. No. 15/459,851 which is a continuation of and claims priority to co-pending U.S. application Ser. No. 14/832,197, filed Aug. 21, 2015, issued as U.S. Pat. No. 9,623,876 on Apr. 18, 2017, which is a continuation of U.S. application Ser. No. 13/904,682, filed May 29, 2013, issued as U.S. Pat. No. 9,147,353 on Sep. 29, 2015 and entitled "Driving Analysis Using Vehicle-to-Vehicle Communication," which is incorporated herein by reference in its entirety.

TECHNICAL FIELD

Aspects of the disclosure generally relate to the analysis of vehicle driving data. In particular, various aspects of the disclosure relate to receiving and transmitting driving data using vehicle-to-vehicle (V2V) communications, analyzing driving data, determining driving behaviors

BACKGROUND

Many vehicles include sophisticated sensors and advanced internal computer systems designed to monitor and control vehicle operations and driving functions. Advanced vehicles systems can perform such tasks as monitoring fuel consumption and optimizing engine operation to achieve higher fuel efficiency, detecting and correcting a loss of traction on an icy road, and detecting a collision and automatically contacting emergency services. Various vehicle-based communication systems allow vehicles to communicate with other devices inside or outside of the vehicle. For example, a Bluetooth system may enable communication between the vehicle and the driver's mobile phone. Telematics systems, such as on-board diagnostics (OBD) systems installed within vehicles, may be configured to access vehicle computers and sensor data and transmit the data to a display within the vehicle, a personal computer or mobile device, or to a centralized data processing system. Data obtained from OBD systems has been used for a variety of purposes, including maintenance, diagnosis, and analysis. Additionally, vehicle-to-vehicle (V2V) communication systems can be used to provide drivers with safety warnings and collision alerts based on data received from other nearby vehicles.

When out on the road, vehicles and drivers may engage in many different types of driving behaviors, including various "social interactions" with other vehicles and drivers. Some social interactions, such as proper signaling and yielding to other vehicles, characterize safe and prudent driving, while other behaviors, such as tailgating and racing may represent high-risk and unsafe driving.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for receiving and transmitting driving data using vehicle-to-vehicle (V2V) communications, analyzing driving data, determining driving behaviors of vehicles, and calculating driver scores based on the determined driving behaviors. One or more computing devices within a vehicle, such as driving analysis module or a user's mobile device, or an external computer system, may receive vehicle driving data from multiple vehicles nearby one another. Vehicle driving data may be collected by vehicle sensors or other vehicle-based systems, and may be transmitted using one or more V2V communication techniques. Vehicle driving data from multiple vehicles may be analyzed and compared to determine various driving behaviors of the vehicles' drivers. For example, negative driving behaviors such as tailgating, cutting-off, brake-checking, preventing another vehicle from merging, or racing, and positive driving behaviors such as proper signaling, yielding, defensive avoidance, or allowing another vehicle to merge, may be determined by analyzing the vehicles' speeds, relative positions, distances between, and other available sensor data from one or more of the vehicles.

In accordance with further aspects of the present disclosure, driver scores may be calculated or adjusted based on the determined driving behaviors attributed to vehicle drivers. For example, vehicles/drivers engaging in positive driving behaviors indicative of safe driving may receive higher driver scores, while vehicles/drivers engaging in negative driving behaviors indicative of high-risk driving may receive lower driver scores. According to additional aspects of the disclosure, driver scores also may be calculated or adjusted based on other driver scores received or calculated for nearby vehicles.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 5A-5E are diagrams illustrating examples of various driving behaviors that may be detected using vehicle-to-vehicle communications, according to one or more aspects of the disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
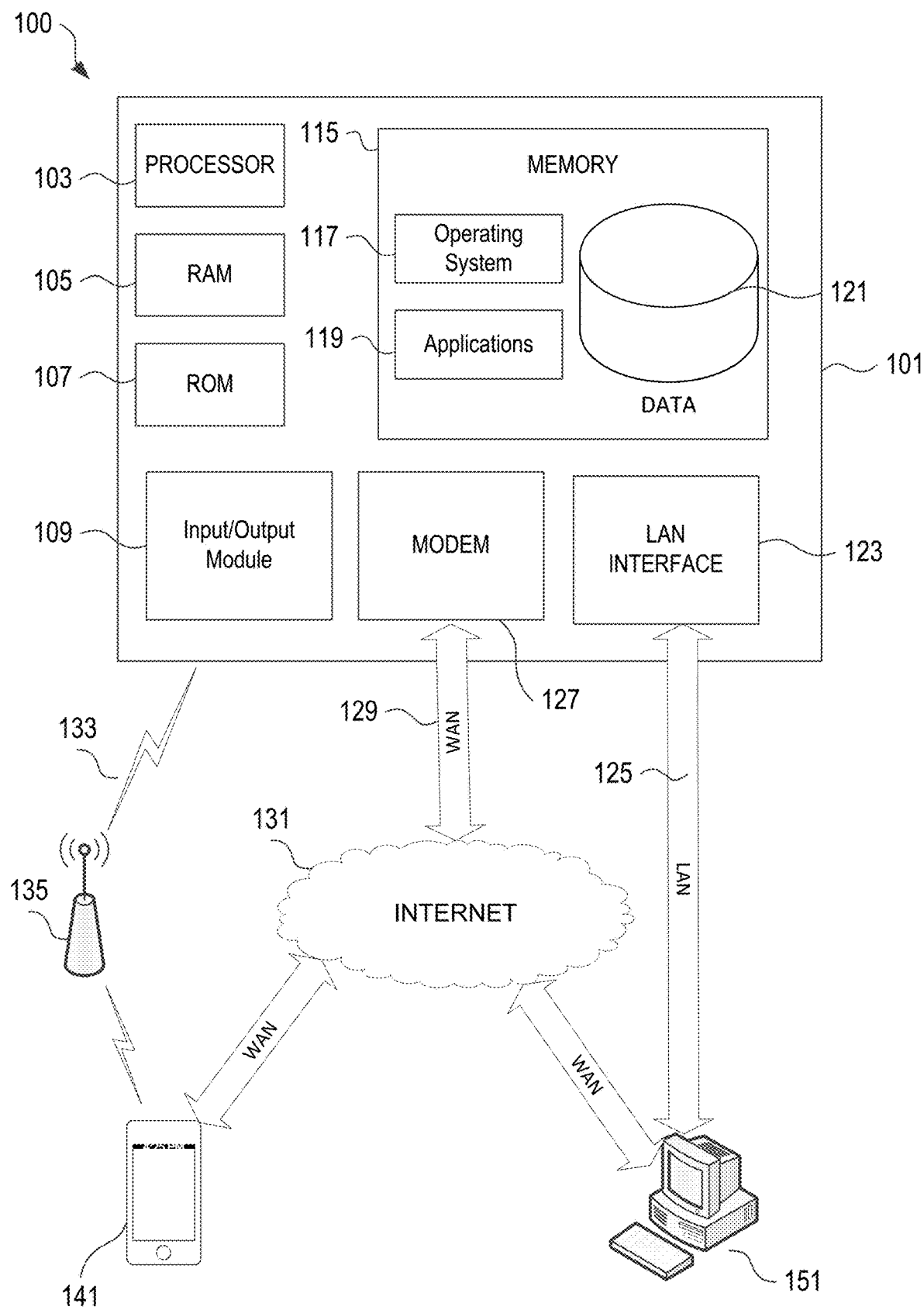
FIG. 1 illustrates a network environment and computing systems that may be used to implement aspects of the disclosure.

FIG. 1 illustrates a block diagram of a computing device 101 in driving analysis communication system 100 that may be used according to one or more illustrative embodiments of the disclosure. The driving analysis device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a driving analysis computing devices or systems, configured as described herein for transmitting and receiving vehicle-to-vehicle (V2V) communications, analyzing vehicle driving data, determining driving behaviors, and calculating driver scores, based on the V2V communications.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the driving analysis system 101 to execute a series of computer-readable instructions to transmit or receive vehicle driving data, analyze driving data and identify driving behaviors, and calculate driver scores.

The driving analysis computing device 101 may operate in a networked environment 100 supporting connections to one or more remote computers, such as terminals/devices 141 and 151. Driving analysis computing device 101, and related terminals/devices 141 and 151, may include devices installed in vehicles, mobile devices that may travel within vehicles, or devices outside of vehicles that are configured to receive and process vehicle and driving data. Thus, the driving analysis computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the driving analysis computing device 101. The network connections depicted in FIG. 1 include a local area network (LAN) 125 and a wide area network (WAN) 129, and a wireless telecommunications network 133, but may also include other networks. When used in a LAN networking environment, the driving analysis computing device 101 may be connected to the LAN 125 through a network interface or adapter 123.

When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the driving analysis computing device 101 may include computer executable instructions (e.g., driving behavior analysis programs and driver score algorithms) for transmitting and receiving vehicle driving data, determining driving behaviors, calculating driver scores for one or more vehicles or drivers, and performing other related functions as described herein.

As used herein, a driver score (or driving score) may refer to a measurement of driving abilities, safe driving habits, and other driver information. A driver score may be a rating generated by an insurance company, financial instruction, or other organization, based on the driver's age, vision, medical history, driving record, and/or other account data relating to the driver. For example, an insurance company server may periodically calculate (i.e., adjust) driver scores for one or more of the insurance company's customers, and may use the driver scores to perform insurance analyses and determinations (e.g., determine coverage, calculate premiums and deductibles, award safe driver discounts, etc.). As discussed below, a driver score may be calculated based on driving data collected by a vehicle sensors and telematics device, and/or additional data received from other nearby vehicles using vehicle-to-vehicle (V2V) communications. For example, if a driver consistently drives at a safe following distance, yields appropriately to approaching cars, and practices defensive avoidance while driving in traffic, then the driver may be given a high or positive driver score. Alternatively, if a driver regularly tailgates, cuts-off, or races with other cars in traffic, then the driver may be given a low or negative driver score.

It should be understood that a driver score, as used herein, may be associated with an individual, group of individuals, or a vehicle. For instance, a family, group of friends or co-workers, or other group that shares one or more vehicles may have a single driver score that is shared by the group. Additionally, a vehicle may have an associated driver score that is based on one or more primary drivers of the vehicle and can be affected by the driving behavior of any the vehicle's drivers. In other examples, a vehicle may be configured to identify different drivers, and each driver of the vehicle may have a separate driver score.

Figure 2:
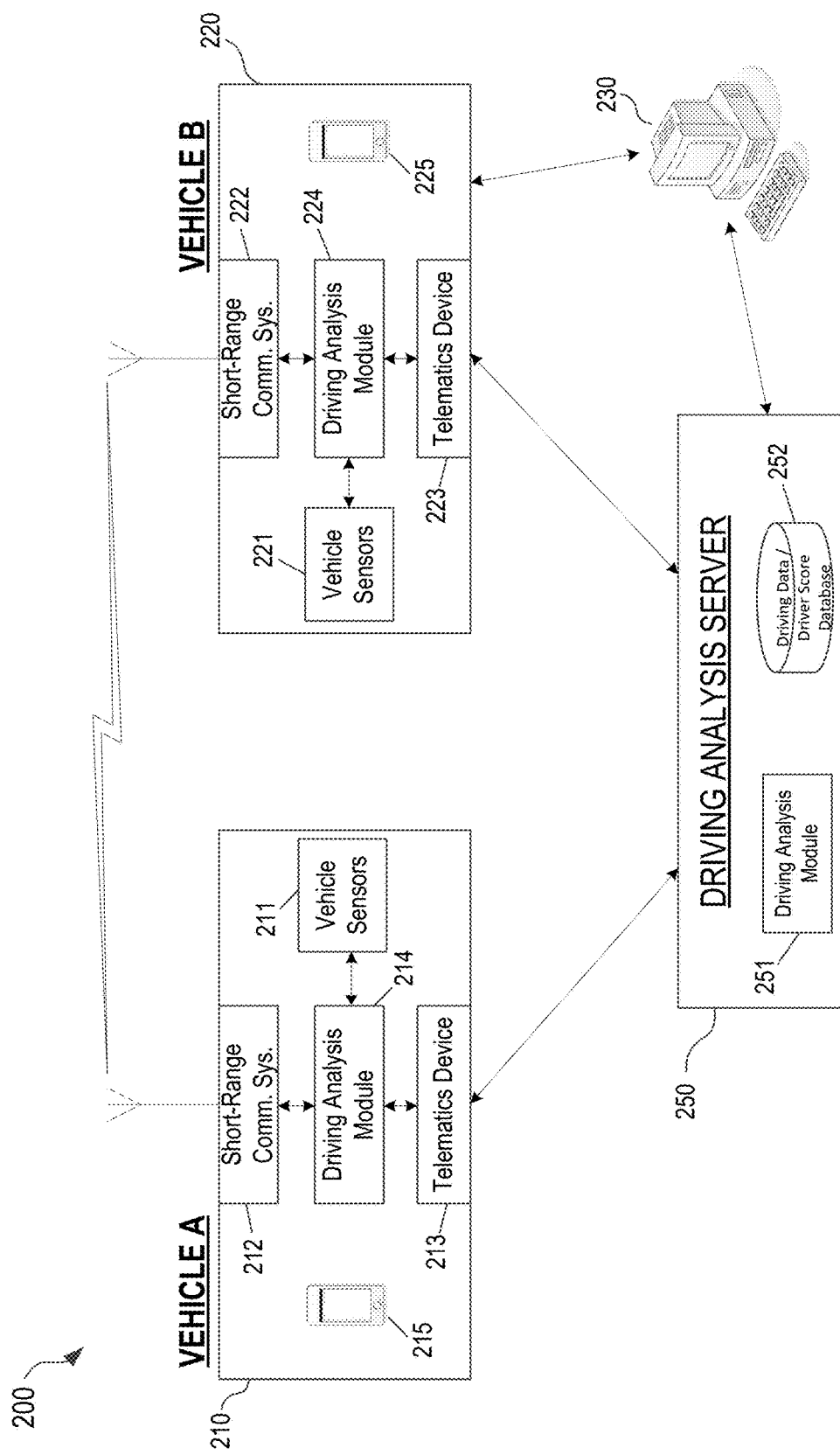
FIG. 2 is a diagram illustrating various components and devices of a driving analysis system, according to one or more aspects of the disclosure.

FIG. 2 is a diagram of an illustrative driving analysis system 200 including two vehicles 210 and 220, a driving analysis server 250, and additional related components. Each component shown in FIG. 2 may be implemented in hardware, software, or a combination of the two. Additionally, each component of the driving analysis system 200 may include a computing device (or system) having some or all of the structural components described above for computing device 101.

Vehicles 210 and 220 in the driving analysis system 200 may be, for example, automobiles, motorcycles, scooters, buses, recreational vehicles, boats, or other vehicles for which a vehicle driving data may be analyzed and for which driver scores may be calculated. The vehicles 210 and 220 each include vehicle operation sensors 211 and 221 capable of detecting and recording various conditions at the vehicle and operational parameters of the vehicle. For example, sensors 211 and 221 may detect and store data corresponding to the vehicle's location (e.g., GPS coordinates), speed and direction, rates of acceleration or braking, and specific instances of sudden acceleration, braking, and swerving. Sensors 211 and 221 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 211 and 221 may detect and store the external driving conditions, for example, external temperature, rain, snow, light levels, and sun position for driver visibility. For example, external cameras and proximity sensors 211 and 221 may detect other nearby vehicles, traffic levels, road conditions, traffic obstructions, animals, cyclists, pedestrians, and other conditions that may factor into a driving event data analysis. Sensors 211 and 221 also may detect and store data relating to moving violations and the observance of traffic signals and signs by the vehicles 210 and 220. Additional sensors 211 and 221 may detect and store data relating to the maintenance of the vehicles 210 and 220, such as the engine status, oil level, engine coolant temperature, odometer reading, the level of fuel in the fuel tank, engine revolutions per minute (RPMs), and/or tire pressure.

Vehicles sensors 211 and 221 also may include cameras and/or proximity sensors capable of recording additional conditions inside or outside of the vehicles 210 and 220. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle). Sensors 211 and 221 also may be configured to collect data a driver's movements or the condition of a driver. For example, vehicles 210 and 220 may include sensors that monitor a driver's movements, such as the driver's eye position and/or head position, etc. Additional sensors 211 and 221 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain vehicle sensors 211 and 221 also may collect information regarding the driver's route choice, whether the driver follows a given route, and to classify the type of trip (e.g. commute, errand, new route, etc.). In certain embodiments, sensors and/or cameras 211 and 221 may determine when and how often the vehicles 210 and 220 stay in a single lane or stray into other lanes. A Global Positioning System (GPS), locational sensors positioned inside the vehicles 210 and 220, and/or locational sensors or devices external to the vehicles 210 and 220 may be used determine the route, lane position, and other vehicle position/location data.

The data collected by vehicle sensors 211 and 221 may be stored and/or analyzed within the respective vehicles 210 and 220, and/or may be transmitted to one or more external devices. For example, as shown in FIG. 2, sensor data may be transmitted via short-range communication systems 212 and 222 to other nearby vehicles. Additionally, the sensor data may be transmitted via telematics devices 213 and 223 to one or more remote computing devices, such as driving analysis server 250.

Short-range communication systems 212 and 222 are vehicle-based data transmission systems configured to transmit vehicle operational data to other nearby vehicles, and to receive vehicle operational data from other nearby vehicles. In some examples, communication systems 212 and 222 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 212 and 222 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 212 and 222 may be sent via DSRC, Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers) or may be implemented by software running on the mobile devices 215 and 225 of drivers and passengers within the vehicles 210 and 220.

The range of V2V communications between vehicle communication systems 212 and 222 may depend on the wireless communication standards and protocols used, the transmission/reception hardware (e.g., transceivers, power sources, antennas), and other factors. Short-range V2V communications may range from just a few feet to many miles, and different types of driving behaviors may be determined depending on the range of the V2V communications. For example, V2V communications ranging only a few feet may be sufficient for a driving analysis computing device 101 in one vehicle to determine that another vehicle is tailgating or cut-off the vehicle, whereas longer communications may allow the device 101 to determine additional types of driving behaviors (e.g., yielding, defensive avoidance, proper response to a safety hazard, etc.).

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, etc.) certain vehicle operation data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle operation data to the other vehicles and/or devices.

The types of vehicle operational data, or vehicle driving data, transmitted by vehicles 210 and 220 may depend on the protocols and standards used for the V2V communication, the range of communications, and other factors. In certain examples, vehicles 210 and 220 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's 210 internal systems that the vehicle is skidding, that an impact has occurred, or that the vehicle's airbags have been deployed, also may be transmitted in V2V communications. In various other examples, any data collected by any vehicle sensors 211 and 221 potentially may be transmitted via V2V communication to other nearby vehicles or infrastructure devices receiving V2V communications from communication systems 212 and 222. Further, additional vehicle driving data not from the vehicle's sensors (e.g., vehicle make/model/year information, driver insurance information, driving route information, vehicle maintenance information, driver scores, etc.) may be collected from other data sources, such as a driver's or passenger's mobile device 215 or 225, driving analysis server 250, and/or another external computer system 230, and transmitted using V2V communications to nearby vehicles and other receiving devices using communication systems 212 and 222.

As shown in FIG. 2, the data collected by vehicle sensors 211 and 221 also may be transmitted to a driving analysis server 250, and one or more additional external servers and devices via telematics devices 213 and 223. Telematics devices 213 and 223 may be computing devices containing many or all of the hardware/software components as the computing device 101 depicted in FIG. 1. As discussed above, the telematics devices 213 and 223 may receive vehicle operation data and driving data from vehicle sensors 211 and 221, and may transmit the data to one or more external computer systems (e.g., driving analysis server 250 of an insurance company, financial institution, or other entity) over a wireless transmission network. Telematics devices 213 and 223 also may be configured to detect or determine additional types of data relating to real-time driving and the condition of the vehicles 210 and 220. In certain embodiments, the telematics devices 213 and 223 may contain or may be integral with one or more of the vehicle sensors 211 and 221. The telematics devices 213 and 223 also may store the type of their respective vehicles 210 and 220, for example, the make, model, trim (or sub-model), year, and/or engine specifications, as well as other information such as vehicle owner or driver information, insurance information, and financing information for the vehicles 210 and 220.

In the example shown in FIG. 2, telematics devices 213 and 223 may receive vehicle driving data from vehicle sensors 211 and 221, and may transmit the data to a driving analysis server 250. However, in other examples, one or more of the vehicle sensors 211 and 221 may be configured to transmit data directly to a driving analysis server 250 without using a telematics device. For instance, telematics devices 213 and 223 may be configured to receive and transmit data from certain vehicle sensors 211 and 221, while other sensors may be configured to directly transmit data to a driving analysis server 250 without using the telematics device 216. Thus, telematics devices 213 and 223 may be optional in certain embodiments.

In certain embodiments, mobile computing devices 215 and 225 within the vehicles 210 and 220 may be used to collect vehicle driving data and/or to receive vehicle driving data from sensors 211 and 221, and then to transmit the vehicle driving data to the driving analysis server 250 and other external computing devices. Mobile computing devices 215 and 225 may be, for example, mobile phones, personal digital assistants (PDAs), or tablet computers of the drivers or passengers of vehicles 210 and 220. Software applications executing on mobile devices 215 and 225 may be configured to detect certain driving data independently and/or may communicate with vehicle sensors 211 and 221 to receive additional driving data. For example, mobile devices 215 and 225 equipped with GPS functionality may determine vehicle location, speed, direction and other basic driving data without needing to communicate with the vehicle sensors 211 or 221, or any vehicle system. In other examples, software on the mobile devices 215 and 225 may be configured to receive some or all of the driving data collected by vehicle sensors 211 and 221.

When mobile computing devices 215 and 225 within the vehicles 210 and 220 are used to detect vehicle driving data and/or to receive vehicle driving data from vehicles 211 and 221, the mobile computing devices 215 and 225 may store, analyze, and/or transmit the vehicle driving data to one or more other devices. For example, mobile computing devices 215 and 225 may transmit vehicle driving data directly to one or more driving analysis servers 250, and thus may be used in conjunction with or instead of telematics devices 213 and 223. Additionally, mobile computing devices 215 and 225 may be configured to perform the V2V communications described above, by establishing connections and transmitting/receiving vehicle driving data to and from other nearby vehicles. Thus, mobile computing devices 215 and 225 may be used in conjunction with or instead of short-range communication systems 212 and 222 in some examples. Moreover, the processing components of the mobile computing devices 215 and 225 may be used to analyze vehicle driving data, determine driving behaviors, calculate driver scores, and perform other related functions. Therefore, in certain embodiments, mobile computing devices 215 and 225 may be used in conjunction with, or in place of, the driving analysis modules 214 and 224.

Vehicles 210 and 220 may include driving analysis modules 214 and 224, which may be separate computing devices or may be integrated into one or more other components within the vehicles 210 and 220, such as the short-range communication systems 212 and 222, telematics devices 213 and 223, or the internal computing systems of vehicles 210 and 220. As discussed above, driving analysis modules 214 and 224 also may be implemented by computing devices independent from the vehicles 210 and 220, such as mobile computing devices 215 and 225 of the drivers or passengers, or one or more separate computer systems 230 (e.g., a user's home or office computer). In any of these examples, the driving analysis modules 214 and 224 may contain some or all of the hardware/software components as the computing device 101 depicted in FIG. 1. Further, in certain implementations, the functionality of the driving analysis modules, such as storing and analyzing vehicle driving data, determining driving behaviors, and calculating driving scores, may be performed in a central driving analysis server 250 rather than by individual vehicles 210 and 220. In such implementations, the vehicles 210 and 220 might only collect and transmit vehicle driving data to a driving analysis server 250, and thus the vehicle-based driving analysis modules 214 and 224 may be optional.

Driving analysis modules 214 and 224 may be implemented in hardware and/or software configured to receive vehicle driving data from vehicle sensors 211 and 221, short-range communication systems 212 and 222, telematics devices 213 and 223, and/or other driving data sources. After receiving the vehicle driving data, driving analysis modules 214 and 224 may perform a set of functions to analyze the driving data, determine driving behaviors, and calculate driver scores. For example, the driving analysis modules 214 and 224 may include one or more driving behavior analysis/driver score calculation algorithms, which may be executed by software running on generic or specialized hardware within the driving analysis modules. The driving analysis module 214 in a first vehicle 210 may use the vehicle driving data received from that vehicle's sensors 211, along with vehicle driving data for other nearby vehicles received via the short-range communication system 212, to determine driving behaviors and calculate driver scores applicable to the first vehicle 210 and the other nearby vehicles. Within the driving analysis module 214, a driver score calculation function may use the results of the driving analysis performed by the module 214 to calculate/adjust driver scores for a driver of a vehicle 210 or other vehicles based on determined driving behaviors. Further descriptions and examples of the algorithms, functions, and analyses that may be executed by the driving analysis modules 214 and 224 are described below in reference to FIGS. 3 and 4.

The system 200 also may include a driving analysis server 250, containing some or all of the hardware/software components as the computing device 101 depicted in FIG. 1. The driving analysis server 250 may include hardware, software, and network components to receive vehicle driving data from one or more vehicles 210 and 220, and other data sources. The driving analysis server 250 may include a driving data and driver score database 252 and driving analysis module 251 to respectively store and analyze driving data received from vehicles and other data sources. The driving analysis server 250 may initiate communication with and/or retrieve driving data from vehicles 210 and 220 wirelessly via telematics devices 213 and 223, mobile devices 215 and 225, or by way of separate computing systems (e.g., computer 230) over one or more computer networks (e.g., the Internet). Additionally, the driving analysis server 250 may receive additional data relevant to driving behavior determinations and driver score calculations from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.)

Data stored in the driving data and driver score database 252 may be organized in any of several different manners. For example, a table in database 252 may contain all of the vehicle operation data for a specific vehicle 210, similar to a vehicle event log. Other tables in the database 252 may store certain types of data for multiple vehicles. For instance, tables may store specific driving behaviors and interactions (e.g., accidents, tailgating, cutting-off, yielding, racing, defensive avoidances, etc.) for multiples vehicles. Vehicle driving data may also be organized by time and/or place, so that the driving behaviors or interactions between multiples vehicles 210 and 220 may be stored or grouped by time and location.

The driving analysis module 251 within the driving analysis server 250 may be configured to retrieve data from the driving data and driver score database 252, or may receive driving data directly from vehicles 210 and 220 or other data sources, and may perform driving data analyses, driving behavior determinations, driver score calculations, and other related functions. The functions performed by the driving analysis module 251 may be similar to those of driving analysis modules 214 and 224, and further descriptions and examples of the algorithms, functions, and analyses that may be executed by the driving analysis module 251 are described below in reference to FIGS. 3 and 4.

In various examples, the driving data analyses, driving behavior determinations, and driving score calculations may be performed entirely in the driving analysis module 251 of the driving analysis server 250 (in which case driving analysis modules 214 and 224 need not be implemented in vehicles 210 and 220), or may be performed entirely in the vehicle-based driving analysis modules 214 and 224 (in which case the driving analysis module 251 and/or the driving analysis server 250 need not be implemented). In other examples, certain driving data analyses may be performed by vehicle-based driving analysis modules 214 and 224, while other driving data analyses are performed by the driving analysis module 251 at the driving analysis server 250. For example, a vehicle-based driving analysis module 214 may continuously receive and analyze driving data from nearby vehicles to determine certain driving behaviors (e.g., tailgating, cutting-off, yielding, etc.) so that large amounts of driving data need not be transmitted to the driving analysis server 250. However, after a positive or negative driving behavior is determined by the vehicle-based driving analysis module 214, the behavior may be transmitted to the server 250, and the driving analysis module 251 may determine if a driver score should be updated based on the determined driving behavior.

Figure 3:
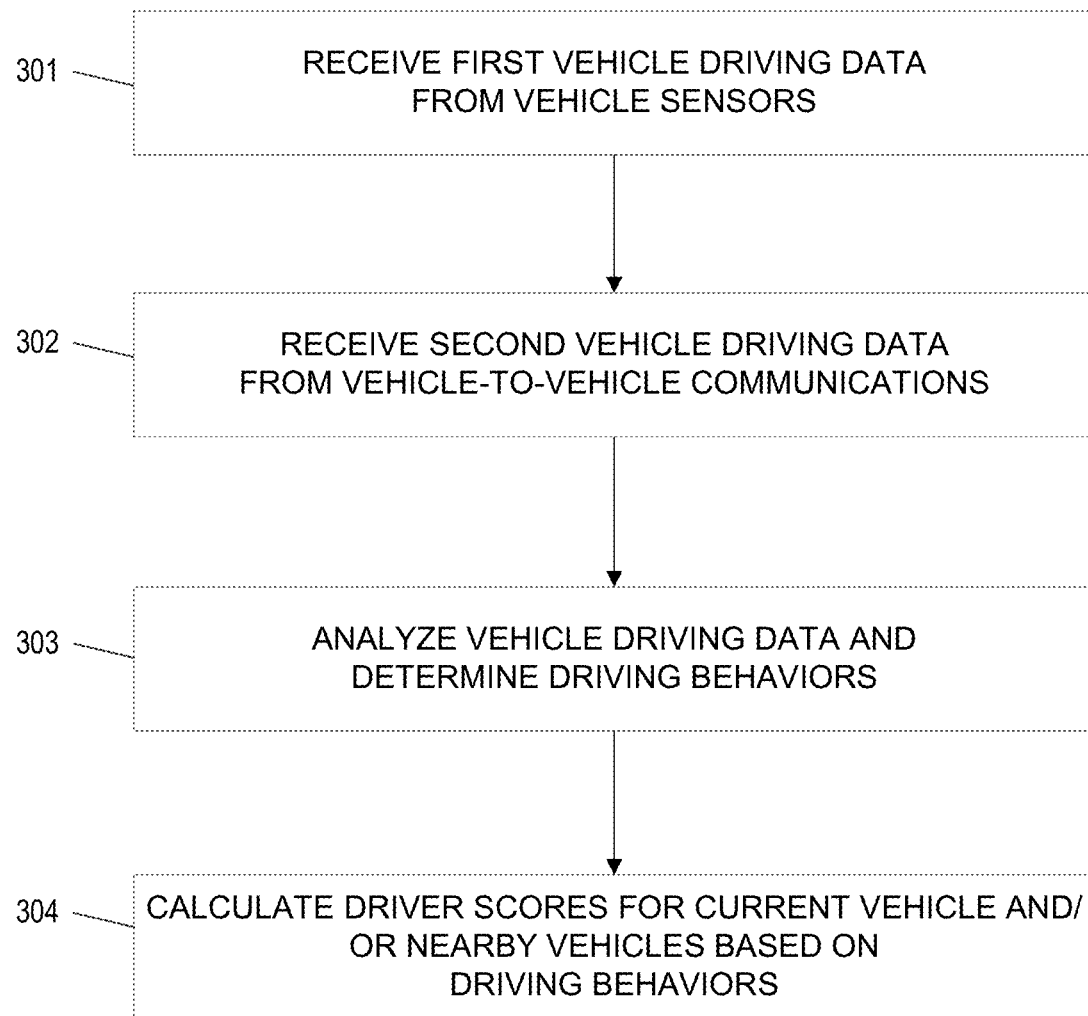
FIG. 3 is a flow diagram illustrating an example method of analyzing vehicle driving data, determining driving behaviors, and calculating driver scores using vehicle-to-vehicle communications, according to one or more aspects of the disclosure.

FIG. 3 is a flow diagram illustrating an example method of performing driving behavior determinations and driver scores calculations based on analyses of vehicle driving data from vehicle-to-vehicle communications. This example method may be performed by one or more computing devices in a driving analysis system, such as vehicle-based driving analysis modules 214 and 224, a driving analysis module 251 of a driving analysis server 250, user mobile computing devices 215 and 225, and/or other computer systems.

The steps shown in FIG. 3 describe performing an analysis to determine driving behaviors between vehicles using V2V communications, and then calculating or adjusting driver scores based on the determined driving behaviors. Driving behaviors may include any number of identifiable "social interactions" between two or more vehicles on the road, including negative behaviors such as tailgating, cutting-off, brake-checking, preventing another vehicle from merging, and racing, or positive behaviors such as yielding, defensive avoidance, or allowing another vehicle to merge. Occurrences of negative driving behaviors may indicate a high-risk or unsafe driver, while occurrences of positive driving behaviors may indicate a low-risk or safe driver. In some cases, a first vehicle 210 might not be actively involved in a driving behavior, but may be involved only as an object of another vehicle's 220 driving behavior (e.g., a vehicle 210 being tailgated by another vehicle 220, or a vehicle 210 allowed to merge by another vehicle 220), in which case the determination of the driving behavior may be neither positive nor negative with respect to vehicle 210.

In step 301, vehicle driving data may be received for a first vehicle 210, corresponding to data from the vehicle's sensors 211. As described above in reference to FIG. 2, a driving analysis module 214 within vehicle 210 may receive and store vehicle driving data from the vehicle's internal computer systems and any combination of the vehicle's sensors 211. The data received in step 301 may include, for example, the location, speed, and direction of the vehicle 210, object proximity data from the vehicle's external cameras and proximity sensors, and data from the vehicle's various systems used to determine if the vehicle 210 is braking, accelerated, or turning, etc., and to determine the status of the vehicle's user-operated controls (e.g., head lights, turn signals, hazard lights, radio, phone, etc.), along with any other data collected by vehicle sensors 211.

In step 302, vehicle driving data may be received for a second vehicle 220, corresponding to data transmitted via V2V communications. As described above, vehicle driving data may be transmitted from the second vehicle 220 to the first vehicle 210 using short-range communications systems 212 and 222, user mobile devices 215 and 225, or other wireless transmission techniques. In certain examples, DSRC protocols and standards may be used, in which vehicle 220 may periodically broadcast a set of vehicle driving data to any vehicles or other receiving devices within its broadcast range. In some examples, driving data transmitted by vehicle 220 using V2V communication may include basic vehicle location, speed, and trajectory data, such as the GPS coordinates, speed and direction of travel, rate of acceleration or deceleration, and rates of turning data of the vehicle 210. However, the V2V communications may include additional data in various other examples, and may potentially include any or all of the data collected from the vehicle's sensors 221. Additionally, after two vehicles 210 and 220 have established a communication link via short-range communication systems 212 and 222, the vehicles may transmit their bearings (or relative direction) vis-à-vis the other vehicle in V2V communications. In other examples, the first vehicle 210 may determine the bearing of a second nearby vehicle 220 by storing and analyzing multiple V2V transmissions from the vehicle 220 over a period of time.

In step 303, the vehicle driving data received in steps 301 and 302 may be analyzed, and driving behaviors may be determined for the vehicles 210 and 220 based on the driving data. For example, a driving analysis module 214 in a first vehicle 210 may compare the driving data (e.g., location, speed, direction) from its own vehicle sensors 211 (received in step 301) with the corresponding driving data (e.g., location, speed, direction) from a nearby vehicle 220 (received in step 302). Based on the relative locations, speeds, and directions of travel of vehicles 210 and 220, the driving analysis module 214 may determine a driving behavior involving the two vehicles.

Figure 5C:
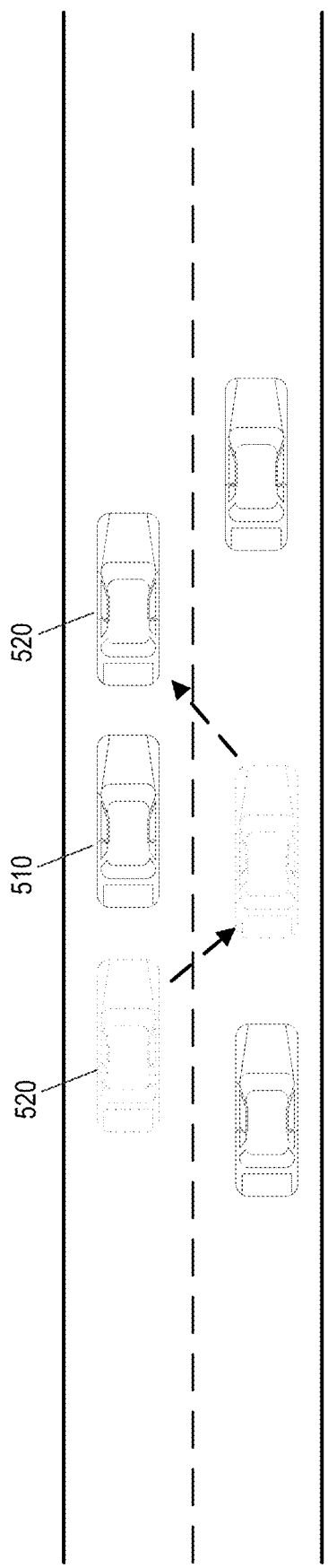

FIGS. 5A-5E illustrate examples of different "social interactions" between two vehicles that may characterize different driving behaviors in step 303. In FIG. 5A, an example of tailgating is shown in which vehicle 510 is tailgating vehicle 520. A driving analysis module 214 in either vehicle 510 or 520 may detect tailgating in step 303 by comparing the relative positions, speeds, and distances between the two vehicles over a period of time. One or more driving behavior algorithms executed by a driving analysis module 214 may define tailgating in terms of vehicle speed and following distance. For example, a tailgating algorithm may determine that a vehicle is tailgating (T) if its following distance in feet (D), is less than its velocity in miles-per-hour (V) times a tailgating factor, such as: [If D<V, then T], [If D>V*1.1, then T]. [If D<V*1.5, then T], or [If D<V*2, then T], etc. The amount of time that a vehicle is tailgating may also factor into a determination of a tailgating behavior. For example, if the driving analysis module 214 determines that a vehicle's tailgating exceeds a time threshold, which may be consecutive number of seconds tailgating (e.g., 5 seconds, 10 seconds, 30 seconds, etc.), a percentage of driving time tailgating (e.g., 10%, 20%, 50%, etc.), or a total amount of tailgating time in an hour, day, or driving trip (e.g., 1 minute, 5 minutes, 10 minutes, etc.), then the driving analysis module 214 may determine that the vehicle has engaged in a tailgating driving behavior.

In FIG. 5B, an example of defensive avoidance is shown, in which vehicle 520 changes lanes to avoid being tailgated by vehicle 510. A driving analysis module 214 in either vehicle 510 or 520 may detect defensive avoidance by vehicle 520 in step 303, by executing one or more algorithms that define a defensive avoidance driving behavior. For example, if a vehicle is being tailgated (as defined by one or more tailgating algorithms) for at least a minimum time threshold (e.g., 1 second, 5 seconds, 10 seconds, etc.), and then the vehicle being tailgated safely changes lanes to eliminate the tailgating situation, then the driving analysis module 214 may determine that the vehicle has engaged in a defensive avoidance driving behavior. Determinations of defensive avoidance by driving analysis modules 214 also may take into account traffic density. For example, when a current traffic density is greater than a predetermined density threshold, the amount of time that vehicle 520 is given to change lanes in order to count as a defensive avoidance driving behavior may be increased.

In FIG. 5C, an example is shown in which vehicle 520 has cut-off vehicle 510, by changing lanes closely in front of vehicle 510. A driving analysis module 214 may detect cutting-off in step 303 by comparing the relative positions and distances between the two vehicles over a period of time. For example, one or more driving behavior algorithms may define cutting-off as occurrence of a lane change immediately after which the following vehicle is in a tailgating position (as defined by one or more tailgating algorithms). For instance, under the tailgating algorithm [If D>V, then T], if vehicle 520 changes lanes in front of vehicle 510 when both cars are traveling 60 MPH, and the distance between the two vehicles immediately after the lane change is less than 60 feet, then the driving analysis module 214 may determine that vehicle 520 has cut-off vehicle 510. In certain implementations, the following vehicle 510 may be provided a tailgating grace period (e.g., 5 seconds, 10 seconds, etc.) after being cut-off, to allow it increase its following distance, before it can be assessed (or begin to be assessed) with a tailgating driving behavior.

Figure 5D:
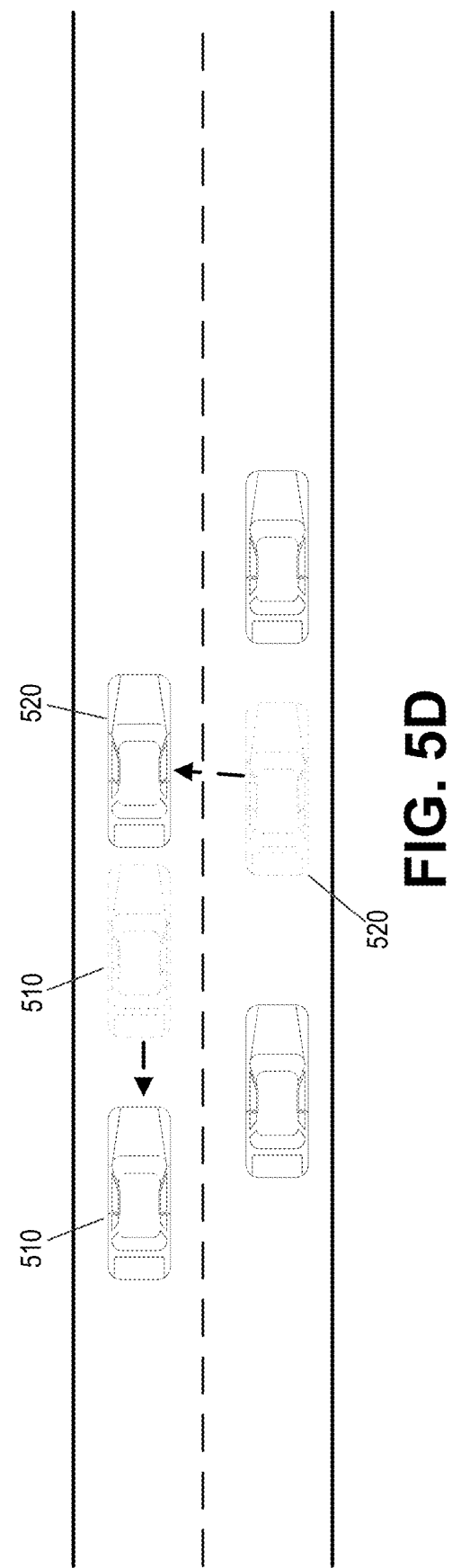

In FIG. 5D, an example of yielding is shown in which vehicle 510 yields to vehicle 520, allowing vehicle 520 to merge into the lane of vehicle 510. As with tailgating and cutting-off, a driving analysis module 214 may determine yielding in step 303 by comparing the relative positions, speeds, and distances between the two vehicles over a period of time. For example, if vehicle 520 expresses an intention to change into the same lane as vehicle 510, and vehicle 510 maintains or reduces speed to safely allow the lane change, then driving analysis module 214 may determine that vehicle 510 has performed a yielding driving behavior. Expressions of intention to change lanes may be determined by, for example, based on speed matching by a vehicle 520 in an adjacent lane, turn signal usage of a vehicle 520 in an adjacent lane (using turn signal data and other vehicle control data transmitted in V2V communications), the ending of an upcoming lane in traffic (using lane ending determinations by vehicle sensors, GPS and navigation data, or other techniques). After a driving analysis module 214 identifies an intention of a nearby vehicle to change lanes, if the vehicle 510 slows down or maintains its speed, so that its following distance is increased to exceed a yielding distance threshold (e.g., V*1.5, V*2, etc.), or so that after the lane change is completed then vehicle 520 will not be in a tailgating position, then the vehicle 510 may be attributed with a positive yielding driving behavior. To the contrary, if vehicle 510 speeds up or decreases its current following distance to prevent the lane change, then vehicle 510 may be attributed with a negative driving behavior for preventing the merging of vehicle 520.

Figure 5E:
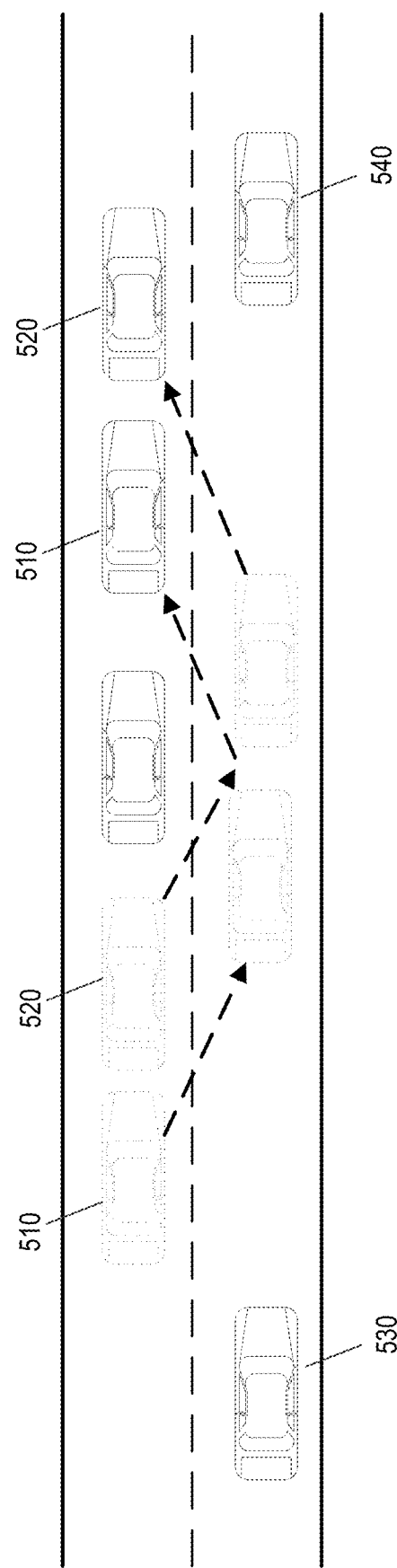

In FIG. 5E, an example is shown of racing by vehicles 510 and 520. As in the examples above, a driving analysis module 214 may detect racing in step 303 by comparing the relative positions, speeds, and distances between the two vehicles 510 and 520 over a period of time, as well as data from other vehicles 530 and 540, and other data sources. For example, one or more driving behavior algorithms may define racing as an occurrence of two or more vehicles 510 and 520 in close proximity to one another (for example, using a proximity threshold, e.g., 100 feet, 0.25 miles, 0.5 miles, 1 mile, etc.), over a period of time (e.g., 30 seconds, 1 minute, etc.), and when the vehicles 510 and 520 are moving faster than the other traffic on the same road by more than a racing speed threshold (e.g., 25% faster, 50% faster, etc.).

In addition to the driving behaviors described above, and the various examples of algorithms and thresholds used to determine occurrences of these driving behaviors, it should be understood that other types of driving behaviors may be detected using V2V communications, and that various other driving behavior determination algorithms and different threshold values may be used as well. Additionally, the driving behaviors described above, or other driving behaviors determined in step 303 may use multiple algorithms and/or thresholds to determine degrees of magnitude for a driving behavior. For example, when determining negative driving behaviors such as tailgating, cutting-off, and racing, a driving analysis module 214 may use different thresholds to determine different levels of severity of the negative behavior. For instance, tailgating under the definition of [If D<V*1.5, then T] for between 5-10 seconds may be considered a minor tailgating behavior, whereas tailgating under the definition of [If D<V*0.7, then T] for more than a minute consecutively may be considered a severe tailgating behavior, and so on.

In step 304, one or more driver scores may be calculated based on the driving behaviors determined in step 303. As discussed above, driver scores may correspond to ratings by insurance companies, financial institutions, or other organizations of the driving abilities, safe driving habits, and other information for a driver or a related group of drivers (e.g., family, roommates, co-workers, or other group of drivers associated with the same vehicle or vehicles). Driver scores may be used to help obtain vehicle financing and determine insurance, rates, coverage, and discounts. If a driving analysis module 214 determines a "negative" (i.e., unsafe or risky) driving behavior for a driver of vehicle 210 in step 303, then the driving analysis module 214 may negatively adjust the driver's driver score in step 304. Similarly, if the driving analysis module 214 determines a "positive" or safe driving behavior in step 303, then the driving analysis module 214 may positively adjust the driver score in step 304. When calculating or adjusting a driver score based on determined driving behaviors, behaviors of greater magnitude (e.g., severe tailgating or racing) may be weighed more heavily than less severe behaviors (e.g., minor tailgating or failure to yield to allow a lane change in traffic). Additionally, minor driving behaviors might not cause any adjustments in driver scores, and some positive and negative behaviors may cancel out so that the driver score might not be adjusted. In some cases, all occurrences of all determined positive and negative driving behaviors may be accumulated and stored over a period of time, such a week, month, year, or for an insurance term, and the accumulated set of driving behaviors may be used to calculate insurance rate adjustments or discounts, along with other factors such as accidents, vehicle maintenance, and driving record. When a specific driver of a vehicle 210 is known, the driving analysis module 214 may calculate or update a driver score for that specific driver. Otherwise, the driving analysis module 214 may calculate or update a driver score corresponding to the vehicle 210 and/or multiple driver scores for different drivers of the vehicle.

As shown in FIG. 3, a single vehicle-based driving analysis module 214 may receive driving data for a first vehicle 210 (step 301), may receive V2V communications including driving data for one or more other vehicles (step 302), may determine driving behaviors (step 303), and may calculate or update driver scores (step 304) for the first vehicle 210. However, other driving analysis modules and/or other computing devices may be used to some or all of the steps and functionality described above in reference to FIG.

3. For example, any of steps 301-304 may be performed by a user's mobile device 215 or 225 within the vehicles 210 or 220. These mobile devices 215 or 225, or another computing device 230, may execute software configured to perform similar functionality in place of the driving analysis modules 214 and 224. Additionally, some or all of the driving analysis functionality described in reference to FIG. 3 may be performed by a driving analysis module 251 at a non-vehicle based driving analysis server 250. For example, vehicles 210 and 220 may be configured to transmit their own vehicle sensor data, and/or the V2V communications data received from other nearby vehicles, to a central driving analysis server 250 via telematics devices 213 and 223. In this example, the driving analysis module 251 of the server 250 may perform the data analysis, determinations of driving behaviors, and driver score calculations for any vehicles 210 and 220 for which it receives driving data.

In some examples, certain functionality may be performed in vehicle-based driving analysis modules 214 and 224, while other functionality may be performed by the driving analysis module 251 at the driving analysis server 250. For instance, vehicle-based driving analysis modules 214 and 224 may continuously receive and analyze driving data for their own vehicles 210 and 220 and nearby vehicles (via V2V communications), and may determine driving behaviors (e.g., tailgating, cutting-off, yielding, racing, etc.) for their own vehicles 210 and 220 and/or the other nearby vehicles. After the vehicle-based driving analysis modules 214 and 224 have determined the driving behaviors, indications of these behaviors may be transmitted to the server 250 so that the driving analysis module 251 can perform the driver score calculations and updates based on the driving behaviors. For instance, vehicles 210 and 220 both may detect a negative driving behavior for a third vehicle, and may report the negative behavior for the third vehicle to the driving analysis server 250, which may access other vehicle and driver information for the third vehicle and may potentially adjust a driver score for the third vehicle based on the driving behaviors reported by vehicles 210 and 220. Additionally, in some examples, a first vehicle 210 (or other V2V receiving infrastructure device, such a roadside receiver at a tollbooth or traffic monitor) may receive V2V communications from multiple other vehicles and determine driving behaviors for those other vehicles, even when the first vehicle 210 (or other receiving device) is not directly involved in the driving behavior. In such cases, indications of the determined driving behaviors may be transmitted to the vehicles involved and/or to an external system (e.g., driving analysis server 250) for the calculation and implementation of driver scores for the vehicles involved. Additionally, in some embodiments, any analysis that might be performed at the driving analysis server 250 may be performed instead within the vehicles, for example, in driving analysis modules 214 and/or 224. For instance, a first vehicle may analyze the driving behaviors of a second vehicle and transmit the determined driving behavior data to the second vehicle and/or additional vehicles. Thus, the driving analysis server 250 may be optional in certain embodiments, and some or all of the driving analyses may be performed within the vehicles themselves.

V2V communication may be used to analyze driving interactions and driving behaviors between two vehicles (e.g., vehicles 210 and 220), as discussed above. In other examples, similar techniques may be used to analyze driving interactions and driving behaviors between three or more vehicles. For instance, racing between three or more vehicles may be detected using similar techniques of V2V communication between each of the vehicles. Additional complex driving interactions may be detected using V2V communications between three or more vehicles. For example, a vehicle in a one lane may drift or change into a second lane, which may cause a vehicle in the second lane to swerve or change lanes into a third lane, etc. These behaviors may be detected and used to identify when certain behaviors (e.g., cutting off, swerving, tailgating) are and are not occurring. Other complex traffic interactions also may be detected and analyzed using V2V communications among groups of vehicle, for example, analyzing the driving behaviors of many drivers at a busy intersection, or in response to a lane starting or ending on a busy street or highway, or other complex traffic interactions.

In some examples, driving interactions may be detected, and driving behaviors may be determined, regarding how drivers respond to nearby aggressive drivers, nearby passive drivers, nearby save drivers, nearby distracted drivers, and the like. For instance, an aggressive driver or distracted driver may cause other drivers nearby to act overly aggressive in response, while a passive and courteous driver may cause other nearby drivers to drive safely in response. Such responses may be detected using V2V communications, and driving analyses/driver score calculations may be based on such responses.

Figure 4:
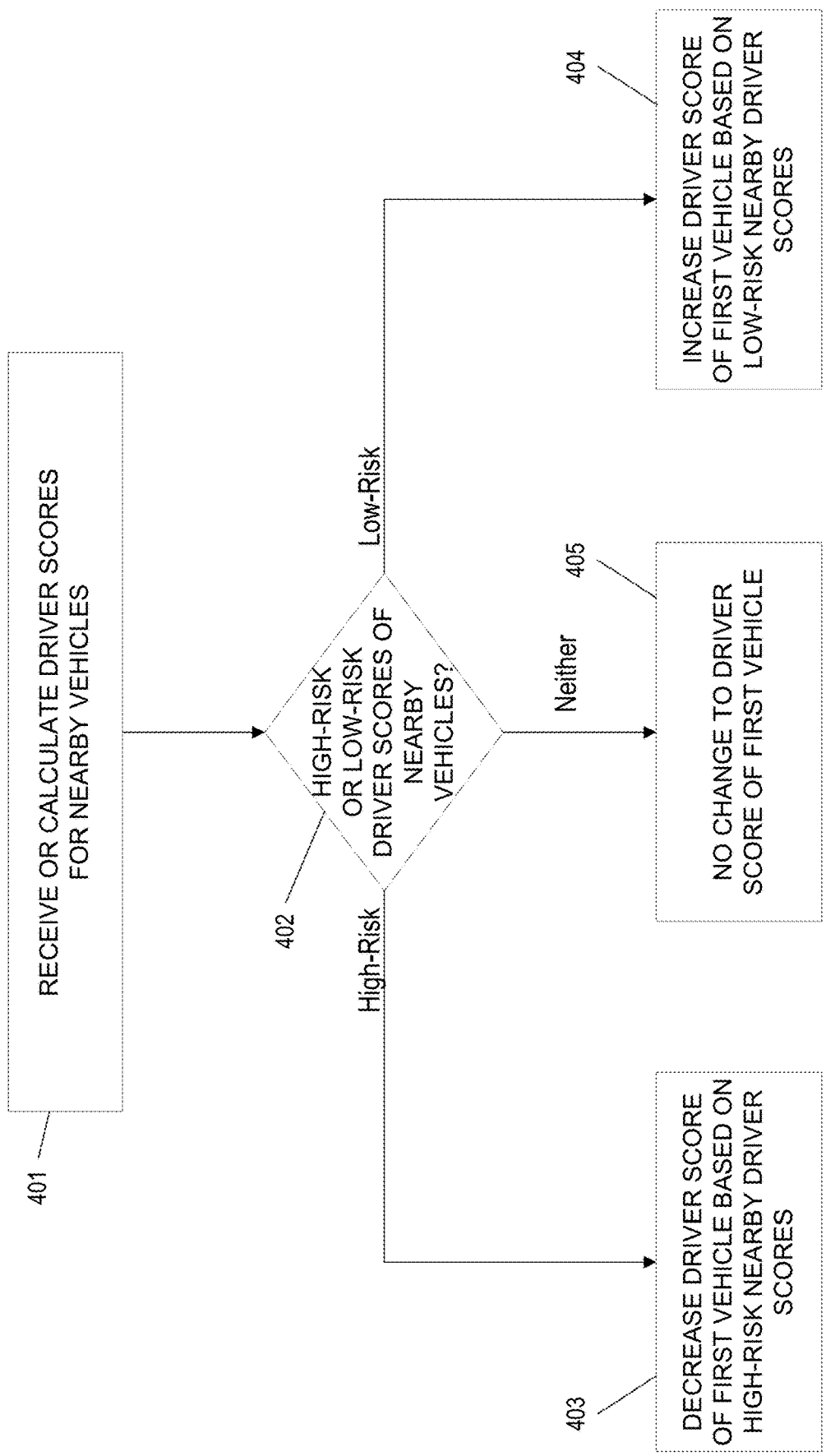
FIG. 4 is a flow diagram illustrating an example method of calculating driver scores based on driver scores of other nearby vehicles, according to one or more aspects of the disclosure.

FIG. 4 is a flow diagram illustrating an example method of calculating driver scores based on the driver scores of nearby vehicles. In step 401, one or more driver scores may be received or calculated for vehicles nearby a first vehicle, using V2V communications. For example, while vehicle 210 is being driven, its short-range communication system 212 may be used to initiate communication links and receive vehicle driving data via V2V communications from other vehicles near vehicle 210. As discussed above, DSRC protocols and standards may be used for V2V communications in some systems, while other various V2V communication hardware, techniques, and protocols may be used in other systems.

Using the vehicle driving data received from other vehicles over V2V communications, the vehicle 210 may calculate driver scores for the other vehicles. As described in reference to FIG. 3, a driving analysis module 214 within the vehicle 210 may calculate or update its own driver scores (e.g., for the driver of the vehicle 210) and/or for the other nearby vehicles by using V2V communications to detect "social interactions" between vehicles that may characterize positive or negative driving behaviors, such as tailgating and cutting-off (negative), or yielding and defensive avoidance (positive). Thus, step 401 may correspond to some or all of steps 301-304, and may include receiving driving data from vehicle sensors (step 301), receiving V2V communications from other nearby vehicles (step 302), determining driving behaviors (step 303), and/or calculating driver scores for the other nearby vehicles based on the determined driving behaviors (step 304).

When a vehicle-based driving analysis module 214 calculates driver scores for other vehicles, these scores may be less complete and/or less accurate than when the driving analysis module 214 calculates driver scores for its own vehicle 210, or when a driving analysis module 251 at an external server 250 calculates driver scores for its associated vehicles. For instance, a vehicle 210 attempting to calculate a driver score for another vehicle 220 on the same road may have only a small amount of data and a few limited interactions on which to base this driver score. Therefore, the driver scores calculated for other nearby vehicles in step 401 may be classified using a relatively simple driving scale (e.g., binary, numerical, etc.). If a nearby vehicle is speeding, weaving, tailgating, racing, or engaging in other negative driving behaviors, then the vehicle may be assigned a low driver score (e.g., "Bad Driver," 1 out of 5, etc.). In contrast, if another nearby vehicle is obeying the speed limit and traffic laws, following at a safe distance, yielding, practicing defensive avoidance, and engaging in other positive driving behaviors, then the vehicle may be assigned a high driver score (e.g., "Good Driver," 5 out of 5, etc.).

In some examples, additional information may be used to calculate driver scores for other vehicles in step 401 in order to increase the accuracy of the driver scores. For example, a vehicle 210 may receive additional vehicle identifying information for other nearby vehicles over the V2V communication link, such as the vehicle's make, model, year, VIN, insurance information, driver information, and/or owner information. The data analysis module 214 of the vehicle 210 may use this additional information to perform a more accurate driver score calculation, or may transmit this information to the driving analysis server 250, which may perform the driver score calculations for the other vehicles after accessing driving records, insurance records, and any other available information regarding the other vehicles or drivers.

In other examples, driver scores may be transmitted from one vehicle to another using V2V communications. For instance, along with its basic vehicle location and trajectory information, and various other sensor and vehicle control data, vehicles 210 and 220 may be configured to store and transmit a current driver score associated with the driver or vehicle to nearby vehicles using V2V communications. A vehicle may store and maintain its current driver score(s) internally, using driving analysis module 214 or on mobile device 215, or may periodically receive updated driver scores from driving analysis server 250 via telematics device 213. In these cases, the vehicle 210 need not determine driving behaviors and calculate driver scores for other nearby vehicles, but rather can just receive and store the driver scores sent by other vehicles in V2V communications.

After determining driver scores for other nearby vehicles in step 401, one or more determinations may be performed in step 402 whether the first vehicle 210 typically drives among high-risk or low-risk drivers or vehicles in step 402. The determinations of step 402 may be performed by a vehicle-based driving analysis module 214, or a mobile device 215, or by a driving analysis module 251 and an external server 250.

To determine whether or not a vehicle 210 typically drives among high-risk or low-risk drivers, the driver scores determined in step 401 may be collected and analyzed over a number of driving trips or a period of time (e.g., over the previous 10 driving hours, 100 driving hours, etc., or over the previous week, month, or year, etc.). The average driver scores and/or other driver score statistics for the vehicles driving near the first vehicle 210 may be compared to one or more high-risk and low-risk thresholds. For example, if vehicle 210 spends more than N hours/week (e.g., 5 hours/week, 10 hours/week, etc.), or N % of its driving time (e.g., 25%, 50%, etc.) driving within range of vehicles with low driver scores, then the driving analysis module 214 may determine that a high-risk driver threshold has been satisfied (402: High-Risk). In contrast, if vehicle 210 spends less than N hours/week (e.g., 2 hours/week, 5 hours/week, etc.), or N % of its driving time (e.g., 5%, 10%, etc.) near vehicles with low driver scores, then the driving analysis module 214 may determine that a low-risk driver threshold has been satisfied (402: Low-Risk). Because both a high-risk and a low-risk threshold are used in this example, the driving analysis module 214 may determine that neither threshold is satisfied and that the first vehicle 210 is typically driven among average-risk traffic, without a predominance of high-risk or low-risk driver scores for nearby vehicles (402: Neither).

In steps 403-405, a driver score for the first vehicle 210 (or the driver of the first vehicle 210) may be updated based on the determination in step 402 of the types of drivers/vehicles among which the first vehicle 210 is frequently driven. If it is determined in step 402 the first vehicle 210 is frequently driven among high-risk vehicles/drivers (402: High-Risk), then the driver score for the first vehicle 210 may be decreased in step 403 to reflect the higher risks associated with frequently driving among high-risk drivers and vehicles. Similarly, if it is determined that the first vehicle 210 is frequently driven among low-risk vehicles/drivers, or is not frequently driven among high-risk vehicles/drivers (402: Low-Risk), then the driver score for the first vehicle 210 may be increased in step 404 to reflect the higher risks associated with frequently driving among high-risk drivers and vehicles. If neither the high-risk nor the low-risk driver thresholds are met (402: Neither), possibly indicating that the vehicle 210 is driven an average amount and in average driving conditions, and not predominately around high-risk or low-risk vehicles/drivers, then the driver score for the first vehicle 210 may be maintained at its current level in step 405.

Although the examples above describe setting or changing a driver score based on the nearby presence of high-risk or low-risk vehicles (or drivers), other calculations may use the presence of high-risk or low-risk vehicles (or drivers) as just one of many factors affecting driver scores calculations. For example, a driver score may be calculated using various equations or algorithms that take into account one or more of a personal driving score (e.g., a measurement of the direct driving behaviors of the driver), a personal exposure value (e.g., a measurement of time, mileage, etc. that the driver is driving near bad or high-risk drivers), a bad/high-risk driver reaction value (e.g., a measurement of how the driver reacts to nearby bad or high-risk drivers), an influence value (e.g., a measurement of how much the driver's behavior is influenced by the behavior of other drivers), and/or a location diversity value (e.g., a measurement of how often the driver drives in the same area), and other related factors. Various different driver score calculations may be implemented using some or all of these values, alone and/or combined in various different algorithms. Additionally, as discussed above, any of the above values or measurements may be calculated for drivers, groups of drivers, or vehicles.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A driving analysis computing device comprising:
a processor; and
a memory storing computer-executable instructions which, when executed by the processor, cause the driving analysis computing device to:
receive, at a first vehicle, vehicle driving data of a plurality of vehicles including a second vehicle from each vehicle using vehicle-to-vehicle communications while in commute when each vehicle is in a predefined proximity of the first vehicle while in commute and when at least one vehicle lane change has occurred with respect to one of the first vehicle or other vehicle of the plurality of vehicles, the at least one vehicle lane change having occurred within a near proximity of another vehicle of the plurality of vehicles;

determine a vehicle driving behavior of each vehicle of the plurality of vehicles while in commute and when the at least one vehicle lane change has occurred by analyzing at least the vehicle driving data, the vehicle driving behavior comprising a respective driver score for each vehicle, each driver score associated with a respective risk level below, at, or higher than a threshold risk level;

determine, while in commute during a commute portion and when the at least one vehicle lane change has occurred, a high threshold risk level frequency over a period of time within which the first vehicle drives in the predefined proximity of the plurality of vehicles having the respective risk level of the threshold risk level or higher, wherein the plurality of vehicles having the respective risk level of the threshold risk level or higher comprises at least one vehicle submitting upon the at least one vehicle lane change a first time vehicle-to-vehicle communication to the first vehicle and wherein the at least one vehicle is newly sharing the commute portion with the first vehicle, the respective risk level being defined by corresponding vehicle driving behavior and driver score of each of the drivers of each of the plurality of vehicles, including the driver of the second vehicle; and reduce a driver score of the first vehicle associated with a driver of the first vehicle upon determining that the high threshold risk level frequency is greater than a predominantly high risk threshold frequency.

2. The driving analysis computing device of claim 1, wherein the instructions, when executed, further cause the driving analysis computing device to:
determine the driver score for the second vehicle, or the driver of the second vehicle, based on the determined vehicle driving behavior of the second vehicle, the driver score being a measurement of driving abilities.

3. The driving analysis computing device of claim 1, wherein the first vehicle further comprises a plurality of vehicle sensors, and
wherein the second vehicle driving data includes further information detected and received by at least one of the vehicle sensors, the information including at least one of:
a speed of the second vehicle;
a position of the second vehicle; or
a direction of travel of the second vehicle.

4. The driving analysis computing device of claim 1, wherein the driver score is generated based on a plurality of vehicle behaviors of the second vehicle or the driver of the second vehicle.

5. The driving analysis computing device of claim 1, wherein determining the vehicle driving behavior of the second vehicle comprises:
determining a first relative position of the second vehicle with respect to the first vehicle at a first time; and
determining a second relative position of the second vehicle with respect to the first vehicle at a second time after the first time.

6. The driving analysis computing device of claim 5, wherein determining the vehicle driving behavior of the second vehicle comprises:

determining that the second vehicle drove within a specified proximity of a rear of the first vehicle for a specified amount of time based on the first and second relative positions and the first and second times, and
wherein the computer-executable instructions further cause the driving analysis computing device to determine a vehicle driving behavior of the first vehicle including determining that the first vehicle changed lanes in response to the vehicle driving behavior of the second vehicle.

7. The driving analysis computing device of claim 5, wherein determining the vehicle driving behavior of the second vehicle comprises:
determining that the second vehicle cut off the first vehicle based on the first and second relative positions and the first and second times.

8. The driving analysis computing device of claim 1, wherein the computer-executable instructions, when executed by the processor, further cause the driving analysis computing device to apply a positive impact on the first vehicle or the driver of the first vehicle by increasing the driver score of the first vehicle associated with the driver of the first vehicle upon determining that the high threshold risk level frequency is equal to or lower than the predominantly high risk threshold frequency.

9. A computer readable medium storing computer-executable instructions that, when executed by a processor, cause a driving analysis computing device to:
receive, at a first vehicle, vehicle driving data of a plurality of vehicles including a second vehicle from each vehicle using vehicle-to-vehicle communications while in commute when each vehicle is in a predefined proximity of the first vehicle while in commute and when at least one vehicle lane change has occurred with respect to one of the first vehicle or other vehicle of the plurality of vehicles, the at least one vehicle lane change having occurred within a near proximity of the other of another vehicle of the plurality of vehicles;

determine a vehicle driving behavior of the each vehicle while in commute and when the at least one vehicle lane change has occurred, based on an analysis of at least the—vehicle driving data of the plurality of vehicles, the vehicle driving behavior of each vehicle comprising a risk level;

determine, while in commute during a commute portion and when the at least one vehicle lane change has occurred, a high threshold risk level frequency over a period of time within which the first vehicle drives in the predefined proximity of the plurality of vehicles having the risk level of a threshold risk level or higher, wherein the plurality of vehicles having the respective risk level of the threshold risk level or higher comprises at least one vehicle submitting upon the at least one vehicle lane change a first time vehicle-to-vehicle communication to the first vehicle and wherein the at least one vehicle is newly sharing the commute portion with the first vehicle, the risk level being defined by corresponding vehicle driving behavior of each of the drivers of each of the plurality of vehicles; and apply a negative impact on a vehicle driving behavior of the first vehicle or a driver of the first vehicle upon determining that the high threshold risk level frequency (ii) is greater than a predominantly high risk threshold frequency.

10. The computer readable medium of claim 9, wherein the instructions, when executed, further cause the driving analysis computing device to:

determine a driver score for the second vehicle, or the driver of the second vehicle, based on the determined vehicle driving behavior of the second vehicle, the driver score being a measurement of driving abilities.

11. The computer readable medium of claim 9, wherein the first vehicle further comprises a plurality of vehicle sensors, and
wherein the second vehicle driving data further includes, as received by at least one of the vehicle sensors, at least one of:
a speed of the second vehicle;
a position of the second vehicle; or
a direction of travel of the second vehicle.

12. The computer readable medium of claim 9, wherein the second vehicle driving data transmitted from the second vehicle comprises a driver score associated with the second vehicle or the driver of the second vehicle, the driver score being generated based on a plurality of vehicle behaviors of the second vehicle or the driver of the second vehicle.

13. The computer readable medium of claim 9, wherein determining the second vehicle driving behavior of the second vehicle comprises:
determining a first relative position of the second vehicle with respect to the first vehicle at a first time; and
determining a second relative position of the second vehicle with respect to the first vehicle at a second time after the first time.

14. The computer readable medium of claim 13, wherein determining the vehicle driving behavior of the second vehicle comprises:
determining that the second vehicle tailgated the first vehicle based on the first and second relative positions and the first and second times, and
wherein the computer-executable instructions further cause the driving analysis computing device to determine a vehicle driving behavior of the first vehicle including determining that the first vehicle changed lanes in response to the vehicle driving behavior of the second vehicle.

15. The computer readable medium of claim 13, wherein determining the vehicle driving behavior of the second vehicle comprises:
determining that the second vehicle cut off the first vehicle based on the first and second relative positions and the first and second times.

16. The computer readable medium of claim 9, wherein the computer-executable instructions, when executed by the processor, further cause the driving analysis computing device to apply a positive impact on the vehicle driving behavior of the first vehicle or the driver of the first vehicle upon determining that the high threshold risk level frequency is equal to or lower than the predominantly high risk threshold frequency.

17. A method comprising:
receiving, by an analysis module of a first vehicle, vehicle driving data of a plurality of vehicles including a second vehicle from each vehicle using vehicle-to-vehicle communications while in commute when each vehicle is in a predefined proximity of the first vehicle while in commute and when at least one vehicle lane change has occurred with respect to one of the first vehicle or other vehicle of the plurality of vehicles, the at least one vehicle lane change having occurred within a near proximity of another vehicle of the plurality of vehicles;
determining, by the analysis module, a vehicle driving behavior of each vehicle while in commute and when the at least one vehicle lane change has occurred by analyzing at least the vehicle driving data of the plurality of vehicles, the vehicle driver behavior of each vehicle comprising a risk level;
determining, by the analysis module, while in commute during a commute portion and when the at least one vehicle lane change has occurred, a frequency over a period of time within which the first vehicle drives in the predefined proximity of the plurality of vehicles having the risk level of a threshold risk level or higher, wherein the plurality of vehicles having the respective risk level of the threshold risk level or higher comprises at least one vehicle submitting upon the at least one vehicle lane change a first time vehicle-to-vehicle communication to the first vehicle and wherein the at least one vehicle is newly sharing the commute portion with the first vehicle, the risk level being defined by corresponding vehicle driving behavior of each driver of each of the plurality of vehicles; and
applying a negative impact on a vehicle driving behavior of the first vehicle or a driver of the first vehicle upon determining that the high threshold risk level frequency is greater than a predominantly high risk threshold frequency.

18. The method of claim 17, wherein determining the vehicle driving behavior of the second vehicle comprises:
determining a first relative position of the second vehicle with respect to the first vehicle at a first time; and
determining a second relative position of the second vehicle with respect to the first vehicle at a second time after the first time.

19. The method of claim 18, wherein determining the vehicle driving behavior of the second vehicle comprises:
determining that the second vehicle tailgated the first vehicle based on the first and second relative positions and the first and second times, and
wherein the method further comprising determining a vehicle driving behavior of the first vehicle including determining that the first vehicle changed lanes in response to the vehicle driving behavior of the second vehicle.

20. The method of claim 17, further comprising:
applying a positive impact on the vehicle driving behavior of the first vehicle or the driver of the first vehicle upon determining that the frequency over the period of time with which the first vehicle, or the driver of the first vehicle, drives in the predefined proximity of the plurality of vehicles having the threshold risk level or higher is equal to or lower than the threshold frequency; and
adjusting an insurance premium associated with the first vehicle or driver of the first vehicle to increase based on applying the positive impact and to decrease based on applying the negative impact.

* * * * *